United States Patent [19]

Woeller et al.

[11] Patent Number: 4,681,142
[45] Date of Patent: Jul. 21, 1987

[54] SELF-COMPENSATING SOLENOID VALVE

[75] Inventors: Fritz H. Woeller, Boulder Creek; Yutaka Matsumoto, San Jose, both of Calif.

[73] Assignee: The United States of America as represented by the Administrator of the National Aeronautics and Space Administration, Washington, D.C.

[21] Appl. No.: 795,945

[22] Filed: Nov. 7, 1985

[51] Int. Cl.$^4$ .............................................. F16K 31/02
[52] U.S. Cl. ........................... 137/614.18; 137/614.11; 251/129.15; 251/175
[58] Field of Search ....................... 137/614.11, 614.18, 137/614.19; 251/129.15, 175

[56] References Cited

U.S. PATENT DOCUMENTS

| 77,517 | 5/1868 | Moore et al. ................... 137/614.11 |
| 504,838 | 9/1893 | Jeannotte ........................ 137/614.11 |
| 2,838,068 | 6/1958 | Ray ............................. 251/129.15 X |
| 2,908,290 | 10/1959 | Hamilton-Peters et al. ... 137/614.11 |
| 3,082,359 | 3/1963 | Mangiafico et al. ....... 251/129.15 X |
| 3,262,027 | 7/1966 | Zaleske et al. ............. 251/129.15 X |
| 4,341,241 | 7/1982 | Baker ........................ 251/129.15 X |

Primary Examiner—A. Michael Chambers
Assistant Examiner—John C. Fox
Attorney, Agent, or Firm—Darrell G. Brekke; John R. Manning; Robert D. Marchant

[57] ABSTRACT

Solenoid valve (10) has a valve chamber (18) within valve body (12). Inlet and outlet tubes (22) and (24) extend through plate (14) into the chamber (18). Movable core (32) in chamber (18) extends into solenoid coil (30). Distal end (38) of core (32) has a silicone rubber plug (40). Other than when solenoid (30) is energized, compressed spring (48) biases core (32) downward so that surface (44) of the plug (40) is in sealing engagement with ends (26) and (28) of the tubes (22) and (24). Any leak at ends (26) and (28) increases pressure in the chamber (18), resulting in increased sealing force of the plug (40) against the other end (26) or (28). Flow direction through the valve (20) is easily reversed by changing connections to the tubes (22) and (24).

5 Claims, 1 Drawing Figure

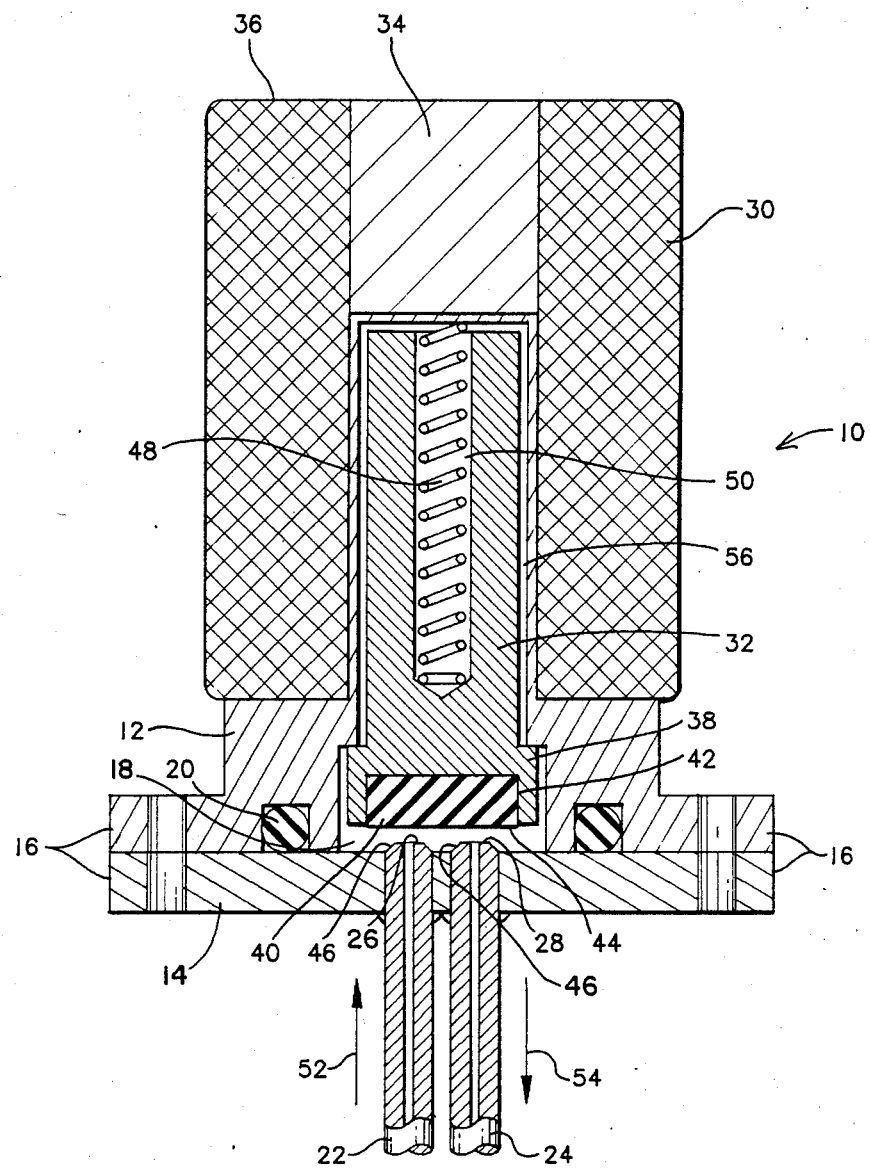

SELF-COMPENSATING SOLENOID VALVE

ORIGIN OF THE INVENTION

The invention described herein was made by employees of the United States Government and may be manufactured and used by or for the Government for governmental purposes without the payment of any royalties thereon or therefor.

BACKGROUND OF THE INVENTION

1. Field of the Invention

This invention relates to a solenoid valve with enhanced sealing and opening characteristics. More particularly, it relates to such a valve that will utilize any inlet or outlet leakage pressure to provide a better outlet or inlet seal in a bi-directional manner. Most especially, it relates to such a valve suitable for controlling flows in gas chromatographs and similar precision applications.

2. Description of the Prior Art

A variety of solenoid valve configurations for controlling fluid flow are known in the art. Representative prior art solenoid valve designs are disclosed in the following issued U.S. Pat Nos.: 3,878,859, issued April 22, 1975 to Grob et al. and 4,453,700, issued June 12, 1984 to Otsuki et al. Other examples of prior art solenoid valves suitable for gas chromatograph and similar applications are commercially available from Pyronetics Division of Parker-Hannifin and from ITT under the designation of Microsol.

Prior art solenoid valve designs provide a single seal between their fluid inlet and outlet. If this single seal becomes ineffective, fluid flow between the inlet and outlet is allowed to take place. Prior art solenoid valves which allow interchanging of the inlet and outlet connections are not symmetrical in configuration and therefore do not operate in a symmetrical manner. Many prior art solenoid valve designs either will not open or will stick open under certain operating conditions.

SUMMARY OF THE INVENTION

Accordingly, it is an object of this invention to provide a solenoid valve incorporating more than one seal in its fluid flow path, in which leakage at one seal operates to make the other seal more effective.

It is another object of the invention to provide a solenoid valve which is free of sticking under a wide variety of operating conditions.

It is a further object of this invention to provide such a solenoid valve that is reliable in operation for an increased number of operating cycles.

It is still another object of the invention to provide a solenoid valve with symmetrical operation when the inlet and outlet connections are interchanged.

The attainment of these and related objects may be achieved through use of the novel solenoid valve herein disclosed. A solenoid valve in accordance with this invention has a valve body and a valve chamber in the valve body. There is a fluid inlet to the valve chamber and a fluid outlet from the valve chamber. A resilient means seals both fluid inlet and the fluid outlet. A solenoid coil is positioned alongside the valve chamber. A movable core is positioned within the solenoid coil. The movable core extends into the valve chamber and is connected to the resilient sealing means. The fluid inlet and the fluid outlet are positioned with respect to the resilient sealing means so that movement of the core within the solenoid coil moves the resilient sealing means into and out of simultaneous sealing engagement with both the fluid inlet and the fluid outlet. A means biases the resilient sealing means in a given direction with respect to the fluid inlet and the fluid outlet, i.e., the biasing means either urges the resilient sealing means away from the fluid inlet and fluid outlet to provide a normally open valve, or biases the resilient sealing means toward the fluid inlet and fluid outlet to provide a normally closed valve.

In operation, the presence of a seal at both the fluid inlet and fluid outlet from the valve chamber means that leakage at either seal tends to make the other seal more effective. As a result, the solenoid valve of this invention is operable over a wider range of operating conditions and is more reliable than prior art solenoid valves.

The attainment of the foregoing and related objects, advantages and features of the invention should be more readily apparent to those skilled in the art, after review of the following more detailed description of the invention, taken together with the drawing, in which:

BRIEF DESCRIPTION OF THE DRAWING

The sole FIGURE of drawing is a cross section of a solenoid valve in accordance with the invention.

DETAILED DESCRIPTION OF THE INVENTION

Turning now to the sole FIGURE of drawing, there is shown a solenoid valve 10 in accordance with the invention, shown in its open position. Valve body 12 and plate 14 are fastened together at mating flanges 16 to form a valve chamber 18. O-ring 20 forms a seal between the plate 14 and the valve body 12. Tubes 22 and 24 extend through the plate 14 and terminate in ends 26 and 28, respectively, within chamber 18.

A solenoid coil 30 is mounted on the valve body 12. A movable solenoid core 32 within the chamber 18 extends into the solenoid coil 30. A fixed solenoid core 34 extends from end 36 of the coil 30 toward the movable core 32 and chamber 18. Enlarged distal end 38 of the movable core 32 has a resilient silicone rubber plug 40 mounted in recess 42 with surface 44 facing the tube ends 26 and 28. The tube ends 26 and 28 are beveled at 46 to prevent damage to surface 44 when the plug 40 is in sealing engagement against the ends 26 and 28.

Compressed spring 48 in bore 50 of the movable core 32 biases the core 32 downward, so that surface 44 of the plug 42 is in sealing engagement against the ends 26 and 28 of the tubes 22 and 24, other than when the solenoid 30 is actuated. When the solenoid 30 is actuated, electromagnetic force is applied to the movable core 32 to overcome the biasing force of spring 48 and move the core 32 upward to the the position shown, opening the valve 10 by moving the surface 44 away from the ends 26 and 28. Fluid may then flow, for example upward in tube 22 to chamber 18, as indicated by arrow 52 and downward from chamber 18 through tube 24, as indicated by arrow 54. Since ends 26 and 28 of the tubes 22 and 24 are sealed in the same manner when the valve 10 is closed, the fluid flow path in the valve 10 may be changed by switching the inlet and outlet connections to the tubes 22 and 24 with symmetrical operation of the valve 10.

Because an increase in pressure within chamber 18 will cause the plug 40 to press against ends 26 and 28 with greater force, leakage of fluid from either end 26 or 28 into chamber 18 will tend to cause a more effective sealing of the surface 44 against the other end 28 or 26. The valve 10 is therefore self compensating for leaks in a bi-directional manner. In practice, the double seal incorporated in this valve is capable of providing positive valve closure at fluid pressures up to at least about 1500 kiloPascals (217 psi).

As shown, there is a sufficient lateral clearance 56 between the movable core 32 and the chamber 18 so that the movable core 32 is free to move sideways in operation of the valve 10. Providing such freedom of sideways movement helps to prevent the valve 10 from sticking in either its open or closed position over a wide variety of pressure and flow conditions through the tubes 22 and 24.

It should now be readily apparent to those skilled in the art that a novel solenoid valve capable of achieving these stated objects of the invention has been provided. The bi-directional sealing action of this valve means that leaks at either the inlet or outlet from the valve are self compensating. The valve may be connected to allow symmetrical flow through the valve in either direction. The configuration of the valve allows it to operate under a wide variety of different fluid pressure and flow conditions without sticking. While the valve as described is especially adapted for precision supply of gas flows in gas chromatographs, valves in accordance with the invention are useful in a wide variety of other gas and liquid flow enviroments as well.

It should further be apparent to those skilled in the art that various changes in form and details of the invention as shown and described may be made. It is intended that such changes be included within the spirit and scope of the claims appended hereto.

What is claimed is:

1. A solenoid valve comprising a valve body, a valve chamber in said valve body, first and second fluid passages providing an inlet to said valve chamber and an outlet from said valve chamber, both of said first and second passages being configured to serve bi-directionally and symmetrically as either the inlet or the outlet, resilient means for sealing said first and second passages, a solenoid coil positioned alongside said valve chamber, a movable core positioned within said solenoid coil, said core extending into said valve chamber and being connected to said resilient sealing means, said first and second passages terminating in coplanar ends of the same configuration facing said resilient sealing means so that movement of said core within said solenoid coil moves said resilient sealing means into and out of simultaneous, separate sealing engagement with said first and second passages, and means positioned halfway along said resilient sealing means between the ends of said first and second passages for biasing said resilient sealing means in a given direction with respect to said first and second passages, said core being positioned within said solenoid coil with sufficient clearance and said valve chamber being configured to allow spontaneous alignment of said sealing means with respect to the ends of said first and second passages to make hermetic contact between said sealing means and the one of said first and second passages serving as the outlet by pivoting said core within said solenoid coil.

2. The solenoid valve of claim 1 in which said first and second passages comprise first and second tubes extending through a wall of said valve body, said first and second tubes terminating in laterally adjacent ends.

3. The solenoid valve of claim 2 in which said resilient sealing means comprises a body of silicone rubber having a surface facing the ends of said first and second tubes.

4. The solenoid valve of claim 3 in which the ends of said first and second tubes are bevelled.

5. The solenoid valve of claim 2 in which said biasing means biases said resilient sealing means against the ends of said first and second tubes.

* * * * *